United States Patent
Mochizuki et al.

[15] 3,686,865
[45] Aug. 29, 1972

[54] INTENSIFYING CYLINDER OF A BRAKE APPARATUS

[72] Inventors: Toyoju Mochizuki, 5-10, 7-chome, Roppongi, Minato-ku, Tokyo; Mamoru Watanabe, 16-9, 6-chome, Takinogawa, Kita-ku, Tokyo, both of Japan

[22] Filed: March 4, 1971

[21] Appl. No.: 120,841

[52] U.S. Cl. .......................................... 60/54.5 HA
[51] Int. Cl. ............................................. F15b 7/00
[58] Field of Search ....60/54.5 HA, 54.6 HA, 54.5 P, 60/54.6 P Primary Examiner—Martin P. Schwadron
Assistant Examiner—A. M. Zupcic
Attorney—Waters, Roditi, Schwartz & Nissen

[57] ABSTRACT

An intensifying chamber is formed in an intensifying cylinder in front of an intensifying piston mechanically driven by a servo motor, and a first hydraulic chamber is formed at the rear of the intensifying piston and is connected to a reservoir of a master brake cylinder. A second hydraulic chamber is formed in said intensifying piston. During forward stroke of the intensifying piston, the volume of the intensifying chamber decreases and transmits hydraulic pressure to a wheel brake while increase in volume change takes place in the first hydraulic chamber to cause inflow of working liquid from the reservoir. The second liquid chamber undergoes no volume change during both forward and rearward strokes of the intensifying piston and is always in communication with the master cylinder. When hydraulic pressure in the second hydraulic chamber reaches a predetermined level, hydraulic pressure in the second hydraulic chamber is transmitted to the first hydraulic chamber.

10 Claims, 3 Drawing Figures

PATENTED AUG 29 1972    3,686,865

INTENSIFYING CYLINDER OF A BRAKE APPARATUS

BRIEF SUMMARY OF THE INVENTION

This invention relates to an intensifying or power cylinder for intensifying hydraulic pressure from a master brake cylinder by operation of a servo motor.

In an intensifying cylinder, it is required, in relation with the braking operation, to minimize the difference between the gradient of the intensification characteristic line not only before the intensifying function of the servo motor reaches the "saturation" point, but the gradient of said characteristic line after the "saturation" point as well. FIG. 2 shows the intensification characteristic of a conventional push type intensifying cylinder where the intensifying piston is driven by a servo motor, and FIG. 3 shows the intensification characteristic of a conventional pull type intensifying cylinder where the intensifying piston is pulled by a servo motor. In these figures, $A_1$ and $A_2$ indicate the intensification characteristic lines before the intensifying function reaches the "saturation" point (i.e. the full extent of its capacity) and $B_1$ and $B_2$ represent the intensification characteristic lines after the intensifying function has reached the "saturation" point. $C_1$ and $C_2$ are the intensification characteristic lines when the piston is driven only by hydraulic pressure from the master cylinder. D is an imaginary line parallel to the characteristic line $C_1$ and E an imaginary line extended from the characteristic line $a_2$. $\alpha_1$ is the angle formed by the lines D and $B_1$, and $\alpha_2$ is the angle formed by the lines E and $B_2$.

As seen from FIGS. 2 and 3, the difference in slope between the characteristic lines $A_1$ and $B_2$ or between the characteristic lines $A_2$ and $B_2$ is very great. Such great difference is undesirable from the aspect of a braking operation since it may disturb the operating sense of the operator. In the case of the push type intensifying cylinder shown in FIG. 2, it is not possible to make the difference in slope between the characteristic lines $A_1$ and $B_1$ zero, but it is possible to make the angle $\alpha_1$ approach zero and thereby minimize such difference. In the case of the pull type intensifying cylinder shown in FIG. 3, it is possible to reduce the difference in slope between the characteristic lines $A_2$ and $B_2$ to zero. In general, however, when the slope of the characteristic line $B_1$ and $B_2$ is increased, the stroke of the intensifying piston is also increased, resulting in increased working liquid discharge of the master cylinder and enlarged stroke of the brake pedal, thus interfering with quick response in the braking operation.

An object of the present invention is to provide brake apparatus by which it is attainable to approximate to zero the angles $\alpha_1$ and $\alpha_2$ in FIGS. 2 and 3 either in a push type intensifying cylinder or in a pull type intensifying cylinder, while minimizing the working liquid discharge of the master cylinder.

According to the present invention, there is provided brake apparatus comprising a first hydraulic chamber formed at the rear of the intensifying piston which increases in volume during forward stroke of the intensifying piston, said first hydraulic chamber being connected to a reservoir through a first check valve adapted to allow passage of the working liquid only in the direction from the reservoir toward the first hydraulic chamber, and a second hydraulic chamber connected to the master cylinder, said second hydraulic chamber being formed in the intensifying piston so as to undergo no volume change either in the forward or backward stoke of the intensifying piston, so that the first hydraulic chamber in the early stage of braking, is supplied with the working liquid from the reservoir and not from the master cylinder as in the conventional systems. On the other hand, since no volume change takes place in the second hydraulic chamber, there is no need of discharging the working liquid from the master cylinder into that chamber. It is therefore possible to confine to a minimum the working liquid discharge from the master cylinder.

Also, in the present invention, a passage is provided between the first and second hydraulic chambers, and in this passage is provided a second check valve adapted to allow passage of the working liquid only in the direction from the second hydraulic chamber to the first hydraulic chamber when hydraulic pressure in the second hydraulic chamber has reached a predetermined level, and the first hydraulic chamber is connected to the master cylinder through a third check valve arranged to allow passage of the working liquid only in the direction from the first hydraulic cylinder to the master cylinder, so that when the early stage of braking passes and hydraulic pressure in the master cylinder reaches a certain predetermined level, the second check valve is opened to transmit hydraulic pressure in the master cylinder to the first hydraulic chamber so that the intensifying piston is driven by hydraulic pressure of the master cylinder aided by the force of the servo motor. Thus, even if the intensifying function by the servo motor reaches the "saturation" point, the intensifying piston is subjected to pressure corresponding to the rise of hydraulic pressure in the master cylinder, so that it is possible to make the angles $\alpha_1$ and $\alpha_2$ in FIGS. 2 and 3 approximately zero suitably selecting the ratio of the effective pressure-receiving area of the intensifying piston on the intensifying chamber side to that on the first hydraulic chamber side. Also, during retraction of the intensifying piston, the working liquid in the first hydraulic chamber is returned to the master cylinder through the third check valve, so the return operation can be conducted without hinderance.

DETAILED DESCRIPTION

Figure 1:
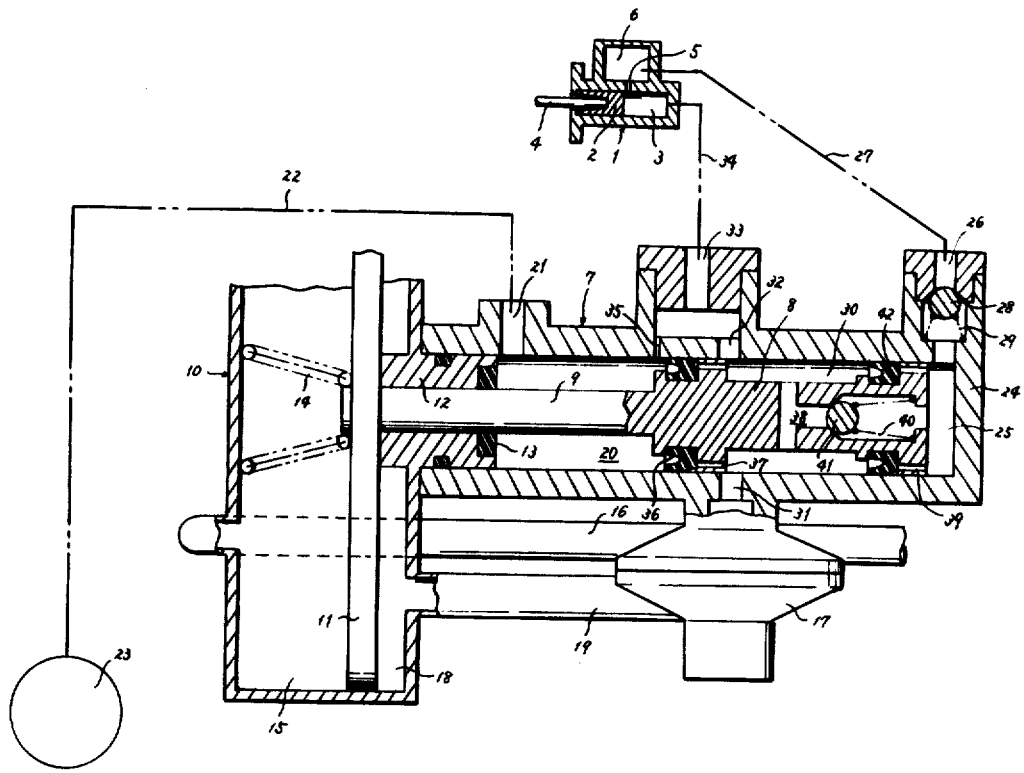
FIG. 1 is a sectional view of an embodiment of brake apparatus according to the present invention.

A pull type intensifying cylinder embodying the present invention will be described in detail with reference to FIG. 1. Therein, reference numeral 1 designates a master cylinder in which a piston 2 is positioned, and in front of said piston 2 is formed a hydraulic chamber 3. The piston 2 is connected to a brake pedal (not shown) through a push rod 4. The hydraulic chamber 3 communicates with a reservoir 6 through a port 5. Opening and closing of port 5 is controlled by an opening-closing device mounted on the piston 2. This opening-closing device is of a known type, and is not shown here. Numeral 7 denotes an intensifying cylinder having disposed therein an intensifying piston 8. Integrally formed with intensifying piston 8 at one end thereof is a pull rod 9 whose other end is secured to a reciprocably movable element 11 of a servo motor 10. The pull rod 9 passes slidably through a cylinder end wall 12 and a seal member 13. The reciprocably movable element 11 of the servo motor 10 is constantly urged rearwardly by a return spring 14. In front of the element 11 is formed a pneumatic pressure chamber 15 which is connected through a pneumatic pressure pipe 16 to a pneumatic pressure controller 17 and a vacuum pump (not shown), while a pneumatic pressure chamber 18 at the rear of the element 11 is connected through a pneumatic pressure pipe 19 to pneumatic controller 17 and the atmosphere.

Between the intensifying piston 8 and the cylinder end wall 12 is formed an intensifying chamber 20 where negative volume change (discharge) is effected during advance stroke of the intensifying piston 8. The intensifying chamber 20 is connected to a wheel brake 23 via a connecting port 21 and a hydraulic pipe 22. Between the intensifying piston 8 and an end wall 24 of the cylinder is formed a first hydraulic chamber 25 where positive volume change (intake) is effected during advance stroke of the intensifying piston. The first hydraulic chamber 25 is connected to the reservoir 6 through a connecting port 26 and a hydraulic pipe 27. In the connecting port 26 is provided a first check valve 28 constructed to allow passage of the working liquid only in the direction from the reservoir 6 toward the first hydraulic chamber 25. Designated by numeral 29 is a valve spring. In the intensifying piston 8 is formed an annular second hydraulic chamber 30 where no volume change takes place. This second hydraulic chamber 30 communicates with the pneumatic pressure controller 17 through a passage 31 and is also connected to the hydraulic chamber 3 in the master cylinder 1 through a passage 32, a connecting port 33 and a hydraulic pipe 34.

In the wall of the intensifying cylinder is formed a return port 35 through which the intensifying chamber 20 and the hydraulic chamber 3 in the master cylinder 1 are in communication. Opening and closing of the return port 35 is controlled by a seal member 36 mounted on the intensifying piston 8. The seal member 36 is also so positioned to shut off passage of the working liquid (from the intensifying chamber 20 to the second hydraulic chamber 30) in a passage 37 connecting both chambers 20 and 30. In the intensifying piston 8 are also formed two passages 38, 39 which connect the first hydraulic chamber 25 and the second hydraulic chamber 30. In the passage 38 is provided a second check valve 41 having a valve spring 40 and constructed to allow passage of the working liquid only in the direction from the second hydraulic chamber 30 to the first hydraulic chamber 25 when liquid pressure in the second hydraulic chamber 30 reaches a predetermined level. The passage 39 is formed by a plurality of bores in the piston 8, and a seal member 42 is mounted in the piston 8 to allow passage of the working liquid only in the direction from the first hydraulic chamber 25 to the second hydraulic chamber 30. This seal member 42 constitutes a third check valve.

When the brake pedal is not pressed, the master cylinder 1, intensifying cylinder 7 and servo motor 10 remain in the condition as shown in FIG. 1. Under this condition, the return port 35 stays open, while the intensifying chamber 20, the hydraulic chamber 3 and the reservoir 6 are in communication with each other. When pressure is applied to the brake pedal to increase the hydraulic pressure in the hydraulic chamber 3 by advance of the piston 2, this hydraulic pressure is transmitted through hydraulic chamber 30 to the pneumatic pressure controller 17 to thereby actuate the latter to raise the pneumatic pressure in the pneumatic pressure chamber 18 of the servo motor 10, urging the reciprocable element 11 to advance and pull the intensifying piston 8 therewith. As the intensifying piston 8 advances, the return port 35 is closed by the seal member 36 so that liquid pressure in the intensifying chamber 20 is increased by the force of the servo motor 10. In the early stage of braking, the working liquid must be discharged from the intensifying chamber 20 to the wheel brake 23 until the shoe in the wheel brake 23 comes into contact with the drum. During this period, liquid pressure in the intensifying chamber 20 is not increased appreciably, and instead, the intensifying piston 8 performs a stroke corresponding to the discharge of the working liquid. When and after the shoe is contacted with the drum in the wheel brake 23, discharge from the intensifying chamber 20 becomes zero, so that movement of the intensifying piston 8 is resisted by the confined liquid and, consequently, liquid pressure in the intensifying chamber 20 is sharply increased owing to the force of the servo motor 10.

In the initial stage of braking, when the intensifying piston 8 undergoes a stroke corresponding to the discharge of the working liquid, hydraulic pressure in the first hydraulic chamber 25 becomes negative in pressure and the first check valve 28 is opened to allow the working liquid to flow into the first hydraulic chamber 25 from the reservoir 6. On the other hand, since hydraulic pressure in the hydraulic chamber 3 in the master cylinder 1 is not yet much increased, the working liquid in the second hydraulic chamber 30 is prevented by the second check valve 41 from flowing into the first hydraulic chamber 25. Therefore, even if the intensifying piston 8 makes a stroke, no volume change takes place in the second hydraulic chamber 30 with which the hydraulic chamber 3 in the master cylinder 1 is in communication, so that the discharge of the working liquid from the hydraulic chamber 3 is very limited. During the period when the intensifying piston 8 sharply increases the hydraulic pressure in the intensifying chamber 20, the hydraulic pressure in the hydraulic chamber 3 in the master cylinder 1, and hence the hydraulic pressure in the second hydraulic chamber 30, is raised considerably, and when this hydraulic pressure reaches a certain predetermined level, the second check valve 41 is opened against the force of the valve spring 40 to transmit hydraulic pressure in the second hydraulic chamber 30 to the first hydraulic chamber 25. Thus, after the second check valve 41 has been opened, the intensifying piston 8 is driven both by traction force of the servo motor 10 and hydraulic pressure force from the hydraulic chamber 3 in the master cylinder 1.

Figure 3:
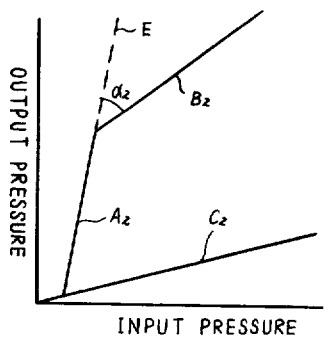

Once pneumatic pressure in the pneumatic pressure chamber 18 of the servo motor 10 reaches atmospheric pressure and the intensifying function of said motor reaches the "saturation" or full capacity point, now only hydraulic pressure in the intensifying chamber 20 is raised in correspondence with rise of hydraulic pressure in the hydraulic chamber 3 in the master cylinder 1. In this case, the rate of pressure increase (expressed by the gradient of the intensification characteristic line $B_2$ in FIG. 3) is equivalent to the ratio of the effective pressure-receiving area $S_1$ of the intensifying piston 8 on the side of the intensifying chamber 20 to the effective pressure-receiving area $S_2$ of the intensifying piston 8 on the side of the first hydraulic chamber 25. The effective pressure-receiving area $S_1$ of the intensifying piston 8 on the intensifying chamber 20 side is obtained by deducting the sectional area of the pull rod 9 from the sectional area of the intensifying piston 8, so that $S_2/S_1$ is greater than unity. The larger the diameter of the pull rod 9 the greater the value of $S_2/S_1$, so that it is possible to approximate the gradient of the intensification characteristic line $B_2$ to the gradient of the characteristic line $A_2$ before the intensifying function is "saturated." When the intensifying piston 8 retracts upon release of braking force, the working liquid in the first hydraulic chamber 25 flows past the seal member 42 into the second hydraulic chamber 30 wherefrom it returns to the hydraulic chamber 3 in the master cylinder 1 and then to the reservoir 6.

The passage 39 may be omitted, and instead, the first hydraulic chamber 25 may be connected to the hydraulic chamber 3 in the master cylinder 1 through a third check valve constructed to allow passage of the working liquid only in the direction from the first hydraulic chamber 25 toward the master cylinder 1.

Figure 2:
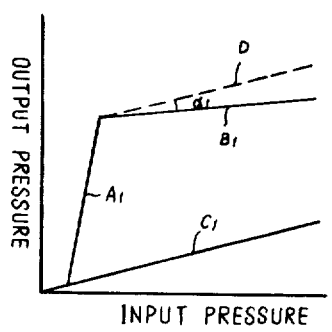
FIGS. 2 and 3 are graphical illustrations showing the intensification characteristics of conventional intensifying cylinders.

In the case of a push type intensifying cylinder, the servo motor 10 is mounted on the side of the cylinder end wall 24, with a push rod being passed through said end wall 24, and the reciprocating element 11 of the servo motor 10 and the intensifying piston 8 are connected together mechanically. In this case, the effective pressure-receiving area $S_2$ of the intensifying piston 8 on the first hydraulic chamber side is obtained by deducting the sectional area of the push rod from the sectional area of the intensifying piston 8, so $S_2/S_1$ is smaller than unity. Therefore, by minimizing the diameter of the push rod, it is possible to approximate the value of $S_2/S_1$ to 1, that is, to make the angle $\alpha_1$ in FIG. 2 equal to zero.

What is claimed is:

1. Braking apparatus comprising an intensifying cylinder, an intensifying piston in said cylinder, a servo motor coupled to said piston to displace the same, said servo motor developing limited force, said cylinder defining an intensifying chamber on one side of said piston which is adapted for connection with the brake of a wheel, said cylinder defining a first hydraulic chamber at the other side of said piston, a brake master cylinder and fluid reservoir, means connecting said reservoir to said first hydraulic chamber, said intensifying piston being provided with a second hydraulic chamber which remains constant in volume, means connecting said second hydraulic chamber to said brake master cylinder, means connecting said servo motor and said master cylinder such that the servo motor will be operated by the master cylinder, and check valve means between said first and second hydraulic chambers to provide communication therebetween as the pressure in the master cylinder reaches a predetermined value whereafter increased pressure in the master cylinder will result in production of a net force on said intensifying piston by the fluid pressure in said first hydraulic chamber to supplement the limited force applied by said servo motor.

2. Braking apparatus as claimed in claim 1 wherein said servo motor is coupled to said intensifying piston to pull the same.

3. Braking apparatus as claimed in claim 1 wherein said servo motor is coupled to said intensifying piston to push the same.

4. Braking apparatus as claimed in claim 1 wherein said intensifying piston is displaced during pressurization to reduce the volume of said intensification chamber and increase the volume of said first hydraulic chamber.

5. Braking apparatus as claimed in claim 4 comprising a check valve between said first hydraulic chamber and said reservoir which is constructed to allow flow in the direction only from the reservoir to said first hydraulic chamber.

6. Braking apparatus as claimed in claim 5 wherein said check valve means between the first and second hydraulic chambers comprises a second check valve constructed to permit flow of pressure fluid only in the direction from the second chamber to said first chamber.

7. Braking apparatus as claimed in claim 6 wherein said second hydraulic chamber is constituted as an annular groove in the periphery of said intensifying piston.

8. Braking apparatus as claimed in claim 7 wherein said intensifying piston has an axial passage connecting said first and second hydraulic chambers, said second check valve being in said passage.

9. Braking apparatus as claimed in claim 8 wherein said intensifying piston has a plurality of additional passages connecting the first and second chambers, and comprising a further check valve blocking flow via said further passages from said second to said first chambers while permitting flow in the opposite direction at a predetermined pressure difference.

10. Braking apparatus as claimed in claim 9 wherein said additional passages are at the periphery of the intensifying piston and said further check valve comprises an annular seal member carried by said intensifying piston and in sealing contact with said intensifying cylinder.

* * * * *

UNITED STATES PATENT OFFICE
CERTIFICATE OF CORRECTION

Patent No. 3,686,865                Dated August 29, 1972

Inventor(s) Toyoju Mochizuki, et. al.

It is certified that error appears in the above-identified patent and that said Letters Patent are hereby corrected as shown below:

On the cover sheet insert -- [30]  Foreign Application Priority Data  March 5, 1970    Japan    45-18332 --- .

Signed and sealed this 20th day of March 1973.

(SEAL)
Attest:

EDWARD M.FLETCHER,JR.                ROBERT GOTTSCHALK
Attesting Officer                    Commissioner of Patents